(No Model.)
A. G. CLARK.
PHOTOGRAPHIC LENS.
No. 399,499. Patented Mar. 12, 1889.
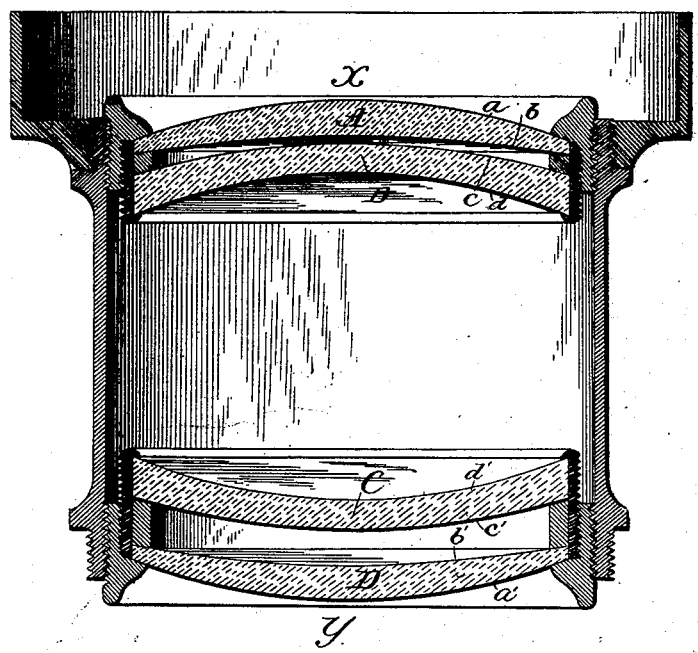
Attest.
Inventor:
Alvan G. Clark.
by
J. B. Chamberlain
Atty.

UNITED STATES PATENT OFFICE.

ALVAN G. CLARK, OF CAMBRIDGEPORT, MASSACHUSETTS.

PHOTOGRAPHIC LENS.

SPECIFICATION forming part of Letters Patent No. 399,499, dated March 12, 1889.

Application filed October 4, 1888. Serial No. 287,202. (No model.)

*To all whom it may concern:*

Be it known that I, ALVAN G. CLARK, a citizen of the United States, residing at Cambridgeport, in the county of Middlesex, and the State of Massachusetts, have invented certain new and useful Improvements in Photographic Tubes or Lenses, of which the following is a specification.

My invention relates to various new and useful improvements in the construction and arrangement of lenses in photographic tubes, of which the following is a true description, reference being had to the accompanying drawing, which shows a section of a tube and lenses, in which X represents the "front combination," so called, and Y the "back combination."

In the practice of my invention or discovery each of the lenses used in the construction of the tube is ground to spherical curves, the front combination, X, being similar in construction and arrangement to the back combination, Y, with the crown-glass lenses outermost in each of said combinations, while the inside lenses, B and C, used to achromatize the front and back combination, respectively, are made from flint-glass.

In the manufacture of photographic tubes the lenses of the back combination have been separated by a ring of blackened metal, which is invariably the practice in portrait-tubes; but those of the front combination are accurately ground to fit each other and cemented firmly together.

It is in reference to the front combination that my invention differs more materially from any photographic tubes heretofore made or known, inasmuch as the lenses of said front combination are separated from each other to a greater or less degree, according to the kind of work required of the tube. By this arrangement I am enabled to secure a large image in which the focus will be of nearly the same excellence throughout, or that quality in photographs technically called "flatness in the field." Moreover, I am enabled to place the crown-glass outermost, which, being the harder glass, is less liable to become scratched by use, and at the same time produce a superior tube at a small expense, owing to the comparative facility with which lenses may be ground on spherical lines.

By the practice of my invention or discovery many of the greater difficulties attendant on the production of photographic tubes are obviated. The requirements of a tube are rapidity, depth of focus, a flat field, and the absence of chromatic aberration or spherical distortion. Such a tube has not been approximated heretofore, except by the use of lenses ground to complicated curves, which render them very expensive, and results in a considerable variation of excellency in the completed article.

The drawing, which is made a part of this specification, shows the arrangement of a tube of twelve-inch focus, approximately, in section, in which the lenses are ground to the following radii: $a$ and $a'$, 2.05; $b$ and $b'$, 6.3; $c$ and $c'$, 3.3; $d$ and $d'$, 2.4. Other measurements may often be used to advantage, but these are deemed very efficient.

Having thus described my invention, I desire to secure by Letters Patent the following claims:

1. In a photographic tube, the combination of a concavo-convex crown-glass lens, D, ground on spherical lines, and a concavo-convex flint-glass lens, C, ground on spherical lines, with a front combination consisting of two similar lenses separated from each other by a ring of blackened metal or substitute therefor, substantially as described and set forth.

2. In a photographic tube, a front combination, X, composed of two lenses having their respective surfaces both ground to spherical curves, or curves practically spherical, substantially as described.

3. In a photographic tube, a front combination, X, composed of two lenses having their respective surfaces both ground to curves which are practically spherical and separated from each other, substantially as described.

ALVAN G. CLARK.

Witnesses:
 HORACE W. WHITNEY,
 GEORGE W. WHITNEY.